US011126068B2

United States Patent
Hu et al.

(10) Patent No.: US 11,126,068 B2
(45) Date of Patent: Sep. 21, 2021

(54) OPTICAL SYSTEM (71) Applicant: TDK TAIWAN CORP., Taoyuan (TW)

(72) Inventors: Chao-Chang Hu, Taoyuan (TW);
Sung-Mao Tsai, Taoyuan (TW);
Liang-Ting Ho, Taoyuan (TW);
Chih-Wei Weng, Taoyuan (TW);
Chia-Che Wu, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 16/796,646

(22) Filed: Feb. 20, 2020

(65) Prior Publication Data
US 2021/0072623 A1  Mar. 11, 2021

Related U.S. Application Data (60) Provisional application No. 62/896,943, filed on Sep. 6, 2019.

(30) Foreign Application Priority Data

Dec. 20, 2019 (EP) .................................... 19218896

(51) Int. Cl.
| | |
|---|---|
| G03B 17/17 | (2021.01) |
| G02B 7/02 | (2021.01) |
| G02B 13/00 | (2006.01) |
| G02B 26/08 | (2006.01) |
| H04M 1/02 | (2006.01) |

(52) U.S. Cl.
CPC .............. *G03B 17/17* (2013.01); *G02B 7/02* (2013.01); *G02B 13/0015* (2013.01); *G02B 26/08* (2013.01); *H04M 1/0264* (2013.01)

(58) Field of Classification Search
CPC .. G03B 17/17; G02B 7/1821; G02B 13/0065; G02B 7/02; G02B 13/00; H02K 2211/03
USPC .......................................................... 396/542
See application file for complete search history.

(56) References Cited

U.S. PATENT DOCUMENTS

| | | | | |
|---|---|---|---|---|
| 7,057,829 B2 * | 6/2006 | Tanigawa | ............... | H05K 1/189 359/704 |
| 7,221,868 B2 * | 5/2007 | Terada | .................... | G03B 17/00 396/542 |
| 8,542,308 B2 * | 9/2013 | Ozawa | .................... | G03B 17/04 348/340 |

(Continued)

FOREIGN PATENT DOCUMENTS

CN  210136351 U  3/2020

OTHER PUBLICATIONS

Office Action dated Dec. 9, 2020 in CN Application No. 202021170421.6 (1 page).

*Primary Examiner* — Christopher E Mahoney
(74) *Attorney, Agent, or Firm* — Muncy, Geissler, Olds & Lowe, P.C.

(57) ABSTRACT

An optical system is provided, including a fixed part, a movable part, a first optical element, a driving assembly, and a circuit assembly. The movable part is movable relative to the fixed part. The first optical element is connected to the movable part. The driving assembly is configured for driving the movable part to move relative to the fixed part. The circuit assembly is electrically connected to the driving assembly.

20 Claims, 12 Drawing Sheets

(56) References Cited

U.S. PATENT DOCUMENTS

| | | | |
|---|---|---|---|
| 8,974,130 B2 * | 3/2015 | Araki | G02B 15/14 |
| | | | 396/529 |
| 9,635,264 B2 * | 4/2017 | Nomura | H04N 5/23287 |
| 2002/0034391 A1 * | 3/2002 | Nakano | G03B 17/00 |
| | | | 396/542 |
| 2011/0150462 A1 * | 6/2011 | Chiu | G03B 17/00 |
| | | | 396/542 |
| 2019/0361260 A1 * | 11/2019 | Jeong | G02B 13/0065 |

* cited by examiner

OPTICAL SYSTEM

CROSS-REFERENCE TO RELATED APPLICATIONS

The present application claims priority to U.S. Provisional Patent Application No. 62/896,943, filed on Sep. 6, 2019, and European Patent Application No. 19218896.9, filed on Dec. 20, 2019, the entirety of which are incorporated by reference herein.

BACKGROUND OF THE DISCLOSURE

Field of the Disclosure

The present disclosure relates to an optical system, and more specifically, this disclosure relates to an optical system of an electrical device.

Description of the Related Art

As the relevant technologies have developed, many electrical devices (such as cameras and smartphones) can record images and videos. However, when a lens having a long focal length is provided in an electrical device, the thickness thereof may be increased, impeding the prospects for miniaturization of the electrical device. Therefore, an optical system capable of minimizing the electrical device is an important issue.

BRIEF SUMMARY OF THE DISCLOSURE

To solve the problems of the prior art, an optical system is provided, including a fixed part, a movable part, a first optical element, a driving assembly and a circuit assembly. The movable part is movable relative to the fixed part. The first optical element is connected to the movable part. The driving assembly is configured for driving the movable part to move relative to the fixed part. The circuit assembly is electrically connected to the driving assembly.

In one of the embodiments of the present disclosure, the optical system further includes two metal circuit assemblies, the fixed part includes a fixed part outer frame, the metal circuit assemblies disposed in the fixed part outer frame, and the metal circuit assemblies have a three-dimensional routing. The fixed part outer frame has a fixed part outer frame bottom surface and two fixed part outer frame body sides, the metal circuit assemblies are disposed in the fixed part outer frame body sides, and extend from the fixed part outer frame bottom surface to the fixed part outer frame body sides, and are exposed to the fixed part outer frame body sides. The circuit assembly includes two circuit board extending parts and two circuit board pin parts, and the circuit board extending parts are connected to the circuit board pin parts. The circuit assembly includes a circuit board extending part and a circuit board pin part, and the circuit board extending part is connected to the circuit board pin part, and the circuit board extending part is coplanar with the circuit board pin part.

In one of the embodiments of the present disclosure, the circuit assembly includes a circuit board body, a circuit board extending part, and a circuit board pin part, the circuit board extending part is connected to the circuit board body and the circuit board pin part, the circuit board body is not coplanar with the circuit board extending part and the circuit board pin part. The optical system further includes a second optical element, wherein the circuit board extending part is attached to the second optical element. The optical system further includes two metal circuit assemblies, wherein the circuit board body has a two-layered plate structure, the metal circuit assemblies are located in different layers of the two-layered plate structure respectively. The first optical element has an optical axis, the circuit board pin part has a plurality of pins, the pins are arranged along the optical axis. The fixed part includes a fixed part outer frame, the fixed part outer frame includes a fixed part outer frame body and a fixed part outer frame surface, and the circuit board body is located between the fixed part outer frame body and the fixed part outer frame surface. The optical system further includes a connecting element, wherein the circuit board extending part is attached to the fixed part outer frame body via the connecting element. The fixed part outer frame body has a fixed part outer frame body bottom surface, the circuit board pin part has a circuit board pin part bottom surface, and the fixed part outer frame body bottom surface is coplanar with the circuit board pin part bottom surface.

In one of the embodiments of the present disclosure, the circuit assembly includes a circuit board body. The circuit board body has two first sides and two second sides. Widths of the second sides is different from widths of the first sides. The first sides have a linear structure, and the second sides have a curved structure. The optical system further includes at least one sensing assembly. The at least one sensing assembly are disposed on the second sides. The first optical element has two sides that are not curved. The optical system further includes a fixed lens module and a prism module, wherein a gap is provided between the fixed lens module and the prism module. The optical system further includes a side. The circuit assembly includes a circuit board pin part. The prism module includes a prism module pin part. The circuit board pin part and the prism module pin part are located on the side. The optical system further includes a connecting element. The connecting element is disposed at the gap between the fixed lens module and the prism module. The first optical element has an optical axis. The first optical element does not overlap the connecting element when observed along the optical axis.

BRIEF DESCRIPTION OF THE DRAWINGS

The invention can be more fully understood by reading the subsequent detailed description and examples with references made to the accompanying drawings, wherein.

DETAILED DESCRIPTION OF THE DISCLOSURE

The making and using of optical systems of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
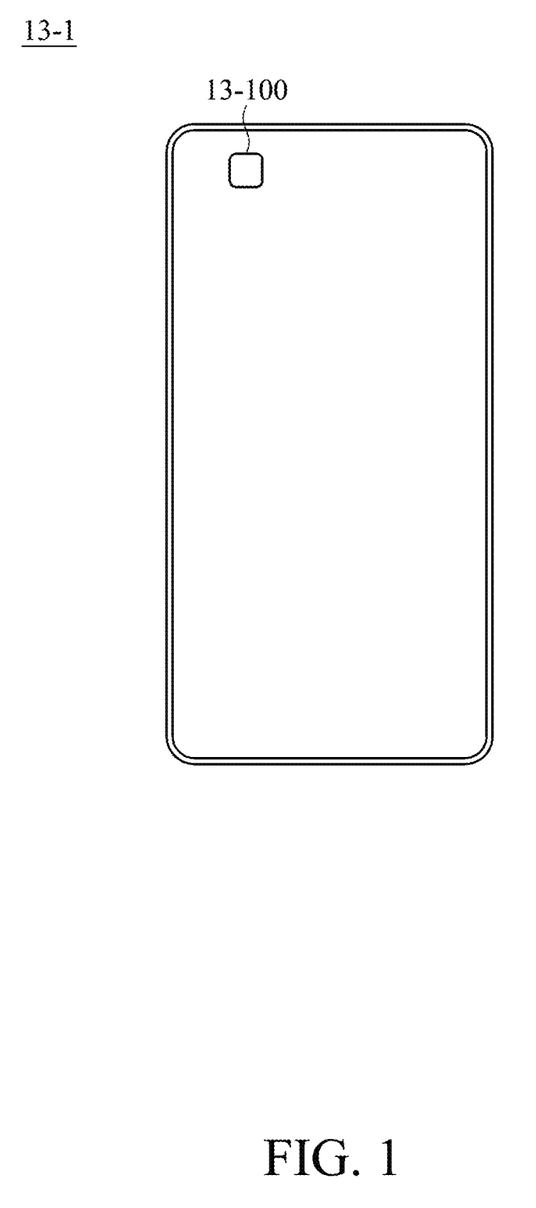
FIG. 1 shows a schematic view of an electrical device with an optical system according to an embodiment of the present disclosure.

Firstly, please refer to FIG. 1, an optical system 13-100 of an embodiment of the present disclosure may be mounted in an electrical device 13-1 for taking photos or videos, wherein the aforementioned electrical device 13-1 may, for example, be a smartphone or a digital camera, but the present disclosure is not limited to these. It should be noted that the position and the size between the optical system 13-100 and the electrical device 13-1 shown in FIG. 1 are only an example, which is not for limiting the position and the size between the optical system 13-100 and the electrical device 13-1. In fact, according to different needs, the optical system 13-100 can be mounted at different positions in the electrical device 13-1.

Figure 2:
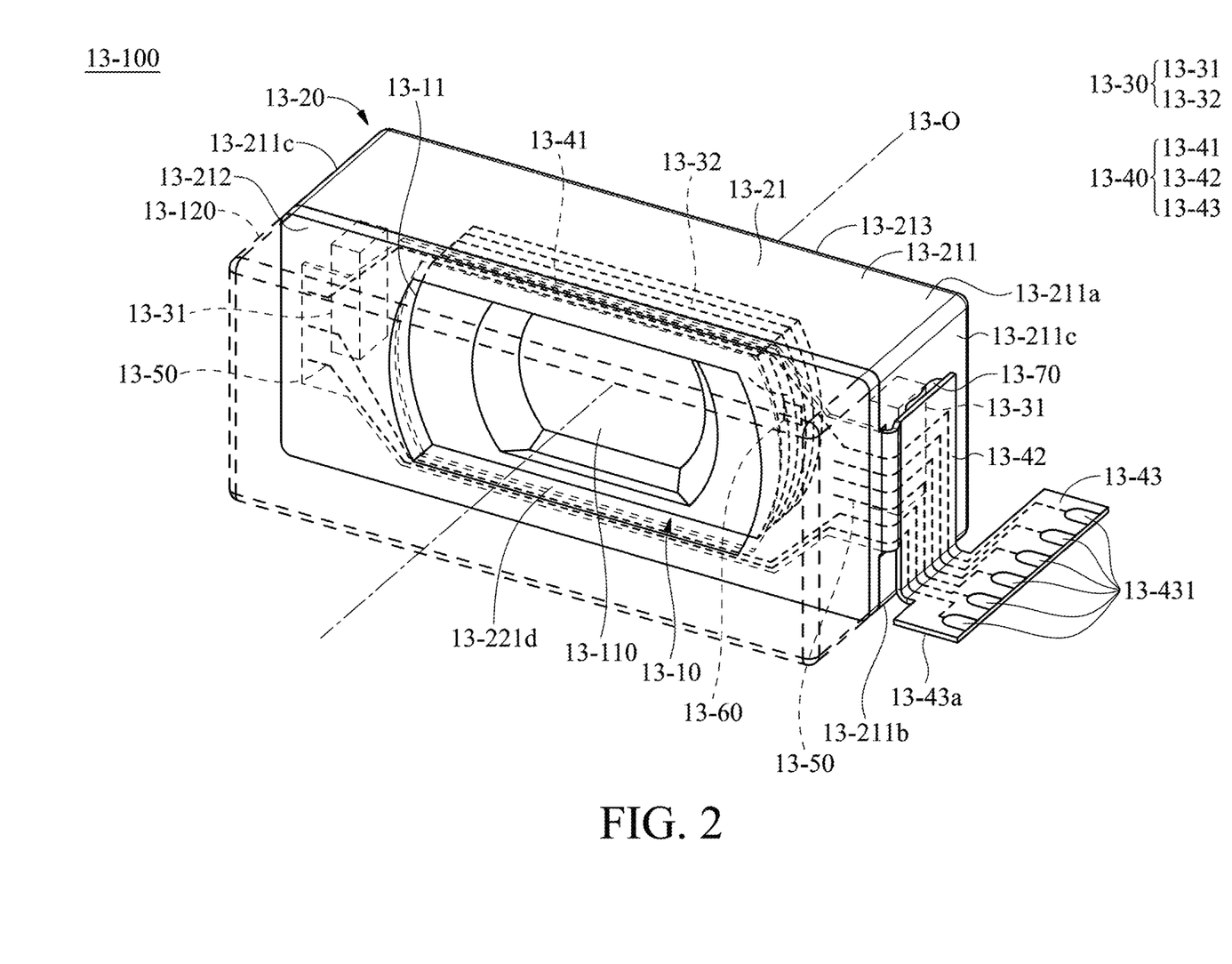
FIG. 2 shows a perspective view of the optical system according to an embodiment of the present disclosure.
Figure 3:
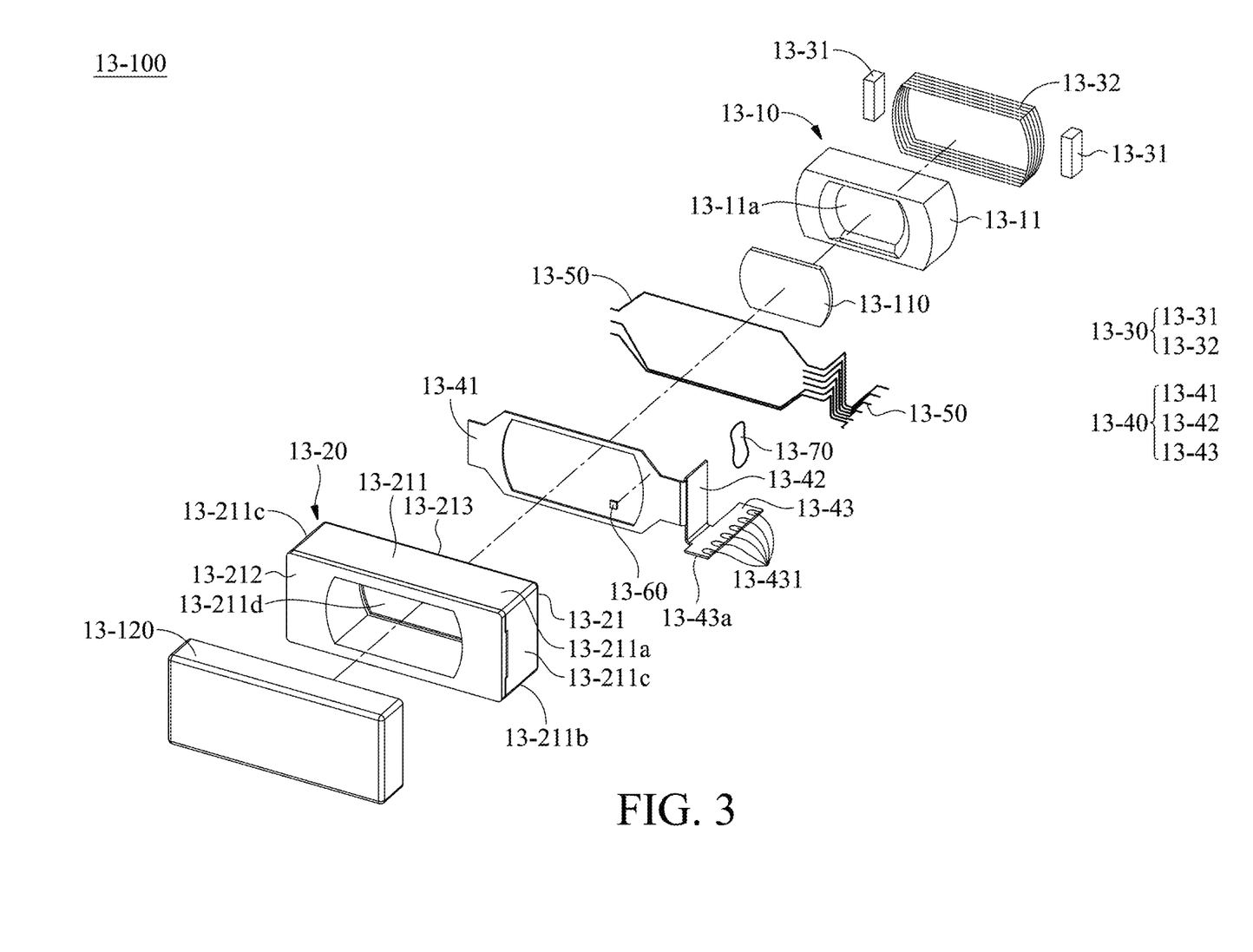
FIG. 3 shows an exploded view of the optical system according to an embodiment of the present disclosure.

Please refer to FIGS. 2 and 3, the optical system 13-100 includes a first optical element 13-110, a second optical element 13-120, a movable part 13-10, a fixed part 13-20, a driving assembly 13-30, a circuit assembly 13-40, two metal circuit assembly 13-50, at least one sensing assembly 13-60 and a connecting element 13-70.

As shown in FIG. 2, the first optical element 13-110 is connected to the movable part 13-10, and the first optical element 13-110 has an optical axis 13-O. The first optical element 13-110 has two sides that are not curved. The second optical element 13-120 is connected to the fixed part 13-20, and the second optical element 13-120 may be an image sensing element.

As shown in FIG. 3, the movable part 13-10 includes a holder 13-11. The holder 13-11 has a hollow ring structure, and has a through hole 13-11a to accommodate the first optical element 13-110.

As shown in FIG. 2, the fixed part 13-20 includes a fixed part outer frame 13-21. The fixed part outer frame 13-21 includes a fixed part outer frame body 13-211, a fixed part outer frame surface 13-212, and a fixed part outer frame bottom surface 13-213. The fixed part outer frame body 13-211 includes a fixed part outer frame body top surface 13-211a, a fixed part outer frame body bottom surface 13-211b, two fixed part outer frame body sides 13-211c, and a fixed part outer frame body opening 13-211d. The fixed part outer frame body opening 13-211d accommodates the holder 13-11 and the first optical element 13-110.

As shown in FIG. 2, the driving assembly 13-30 may drive the movable part 13-10 to move relative to the fixed parts 13-20. The driving assembly 13-30 includes two driving magnetic elements 13-31 and a driving coil 13-32. The driving magnetic element 13-31 is disposed in the fixed part outer frame body opening 13-211d and may be located between the holder 13-11 and the fixed part outer frame body side 13-211c. The driving coil 13-32 is disposed on the holder 13-11. Specifically, the driving coil 13-32 surrounds the holder 13-11. When the driving coil 13-32 receives an external current, the driving coil 13-32 can interact with the driving magnetic element 13-31 and generate an electromagnetic driving force to drive the holder 13-11 to move along the optical axis 13-O relative to the fixed part 13-20.

Please refer to FIG. 2, the circuit assembly 13-40 is electrically connected to the driving assembly 13-30. The circuit assembly 13-40 includes a circuit board body 13-41, a circuit board extending part 13-42, and a circuit board pin part 13-43. The circuit board body 13-41 is located between the fixed part outer frame body 13-211 and the fixed part outer frame surface 13-212. The circuit board body 13-41 is connected to the circuit board extending part 13-42, and the circuit board extending part 13-42 is connected to the circuit board pin part 13-43. The circuit board pin part 13-43 includes a plurality of pins 13-431 and a circuit board pin part bottom surface 13-43a. The pins 13-431 are arranged along the optical axis 13-O. In the present embodiment, the circuit board pin part 13-43 includes six pins 13-431, wherein two of the pins 13-431 are used for the driving coil 13-32, and the remaining four pins 13-431 are used for the sensing element 13-60.

Please refer to FIG. 3, the metal circuit assembly 13-50 is provided on the circuit assembly 13-40, and the metal circuit assembly 13-50 is electrically connected to the pin 13-431. The sensing assembly 13-60 is provided on the circuit board body 13-41, and the sensing assembly 13-60 may detect the change of the magnetic field generated by the driving magnetic element 13-31, thereby determining the position of the movable part 13-10 and the first optical element 13-110. Accordingly, the driving assembly 13-30 may drive the movable part 13-10 to move relative to the fixed part 13-20 based on the detection result of the sensing assembly 13-60.

In some embodiments, the movable part 13-10 may further include a reference element (not shown), the reference element may be disposed in the movable part 13-10. The sensing assembly 13-60 may detect the change in the magnetic field generated by the reference element, thereby determining the position of the movable part 13-10 and the first optical element 13-110. In some embodiments, either the sensing assembly 13-60 or the reference element may be provided on the fixed part 13-20, while the other one of the sensing assembly 13-60 and the reference element may be disposed in the movable part 13-10.

Figure 4:
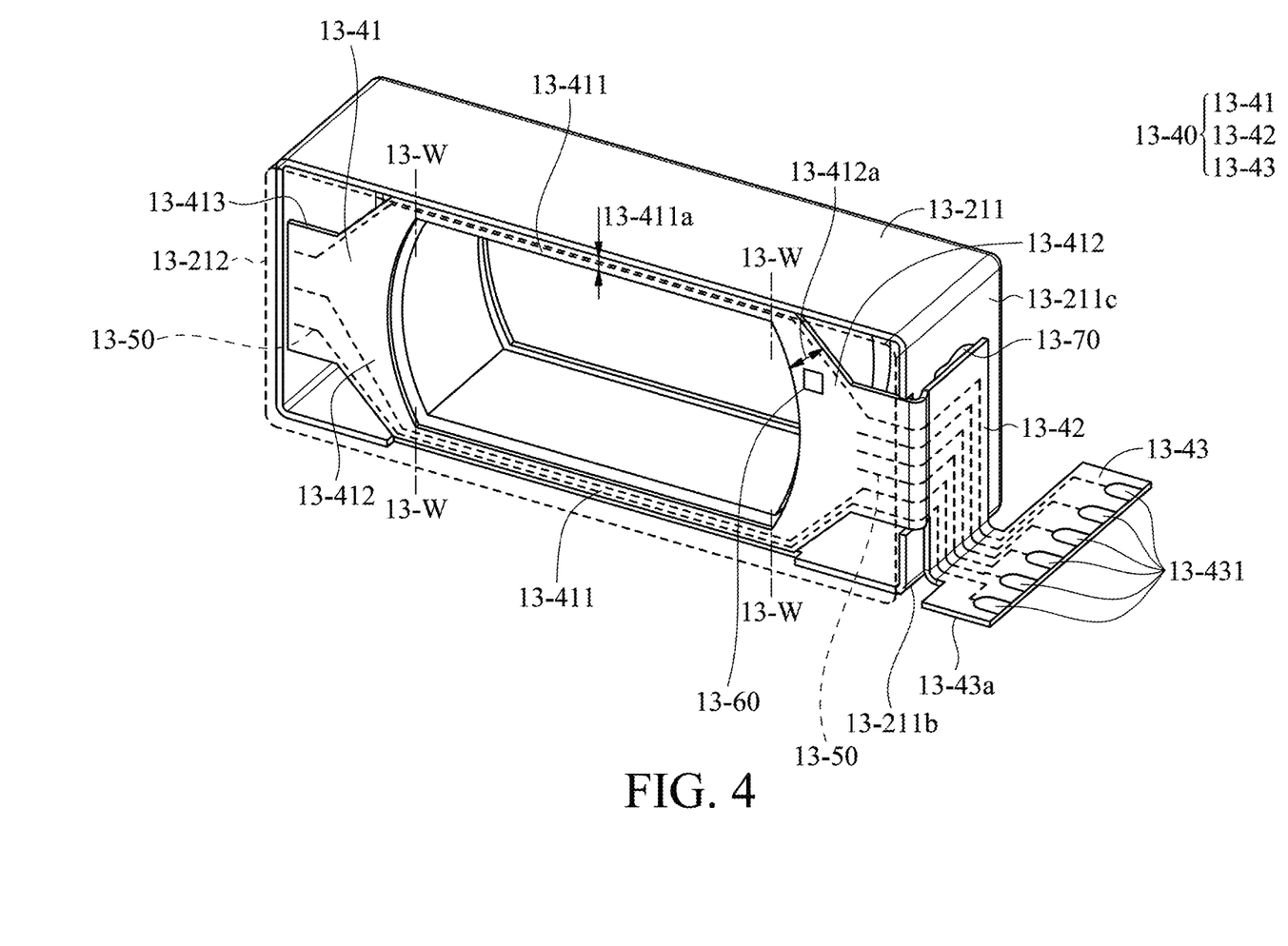
FIG. 4 shows a perspective view of a fixed part outer frame, a circuit assembly, and two metal circuit assemblies of the optical system according to an embodiment of the present disclosure, wherein a fixed part outer frame surface of the fixed part outer frame is shown as a dashed line.

Please refer to FIG. 4, the circuit board body 13-41 has two first sides 13-411 and two second sides 13-412. The boundaries between the two first sides 13-411 and the second sides 13-412 are four dashed lines 13-W. The first side 13-411 has a linear structure, and the second side 13-412 has a curved structure. Moreover, a first width 13-411a of the first side 13-411 is substantially uniform, while a second width 13-412*a* of the second side 13-412 is non-uniform. Furthermore, the first width 13-411*a* of the first side 13-411 and the second width 13-412*a* of the second side 13-412 are different. More specifically, a size of the second width 13-412*a* is substantially greater than a size of the first width 13-411*a*. The sensing element 13-60 is disposed on the second side 13-412, and the sensing element 13-60 is electrically connected to the metal circuit assembly 13-50 to detect the movement of the holder 13-11. The circuit board body 13-41 has a two-layered plate structure 13-413. The metal circuit assemblies 13-50 are respectively located in different layers of the two-layered plate structure 13-413. In this way, a short circuit between the metal circuit assemblies 13-50 themselves may be avoided, and it is convenient for electrically connecting the metal circuit assemblies 13-50 to the pins 13-431 of the circuit board pin part 13-43.

As shown in FIG. 4, the circuit board extending part 13-42 is connected to the circuit board body 13-41, and the circuit board extending part 13-42 is attached to the fixed part outer frame body side 13-211*c* of the fixed part outer frame body 13-211. Furthermore, the connecting element 13-70 is provided between the circuit board extending part 13-42 and the fixed part outer frame body side 13-211*c*, so that the circuit board extending part 13-42 may be more securely attached to the fixed part outer frame body side 13-211*c*.

Please continue to refer to FIG. 4, the circuit board pin part bottom surface 13-43*a* is coplanar with and the fixed part outer frame body bottom surface 13-211*b*. In this way, the contact area between the optical system 13-100 and the electrical device 13-1 is increased, and the optical system 13-100 may be mounted in the electrical device 13-1 more securely.

As shown in FIG. 4, the circuit board body 13-41 is coplanar with the fixed part outer frame surface 13-212, the circuit board extending part 13-42 is coplanar with and the fixed part outer frame body side 13-211*c*, and the circuit board pin part 13-43 is coplanar with the fixed part outer frame body bottom surface 13-211*b*. That is, the circuit assembly 13-40 have a three-dimensional structure, and the circuit board body 13-41, the circuit board extending part 13-42, and the circuit board pin part 13-43 are not coplanar. In this way, the volume of the circuit assembly 13-40 may be effectively reduced, thereby miniaturization of the optical system 13-100 is achieved.

Figure 5:
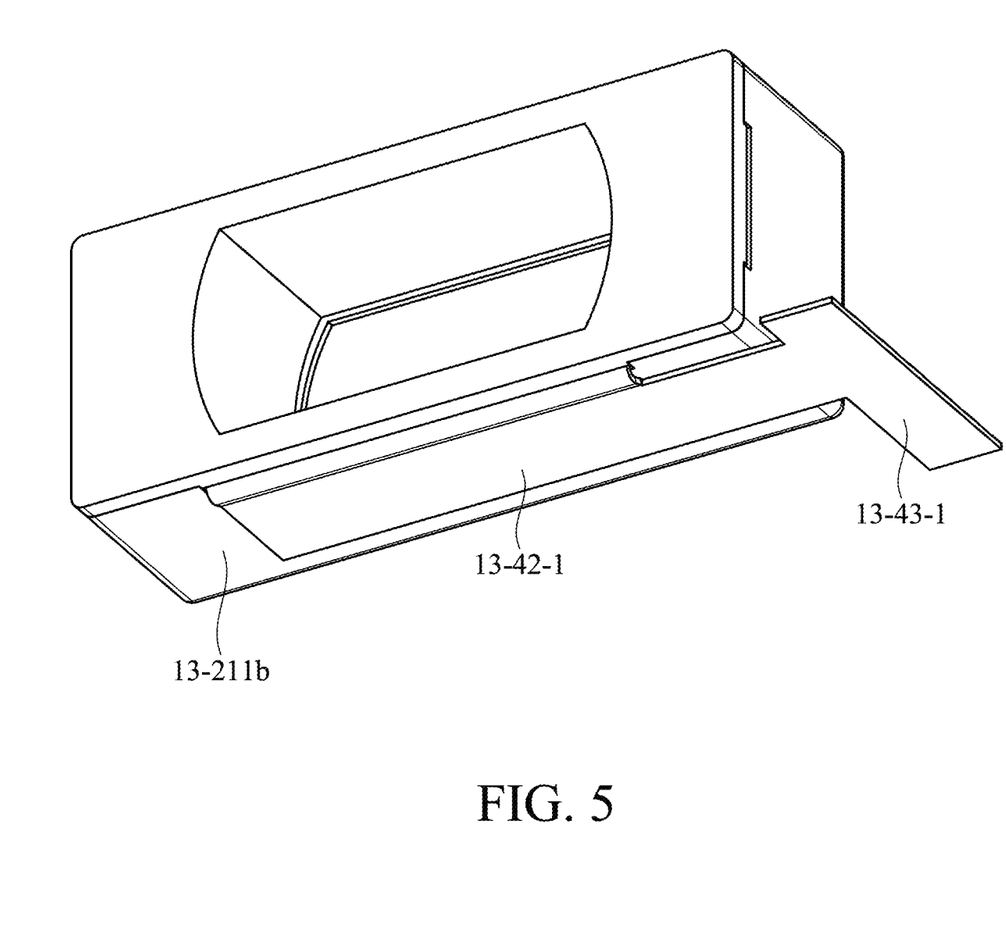
FIG. 5 shows a schematic view of the fixed part outer frame and the circuit assembly of the optical system according to another embodiment of the present disclosure.

Please refer to FIG. 5, in the modified embodiment shown in FIG. 5, the circuit board extending part 13-42-1 is coplanar with the circuit board pin part 13-43-1, and the circuit board extending part 13-42-1 is attached to the fixed part outer frame body bottom surface 13-211*b*. The difference from the embodiment shown in FIG. 4 is that the contact area between the circuit board extending part 13-42-1 and the fixed part outer frame body bottom surface 13-211*b* in the embodiment shown in FIG. 5 is larger than the contact area between the circuit board extending part 13-42 and the fixed part outer frame body side 13-211*c* of the embodiment shown in FIG. 4. Therefore, the circuit board extending part 13-42-1 of the embodiment shown in FIG. 5 is more securely attached to the fixed part outer frame body 13-211.

Figure 6:
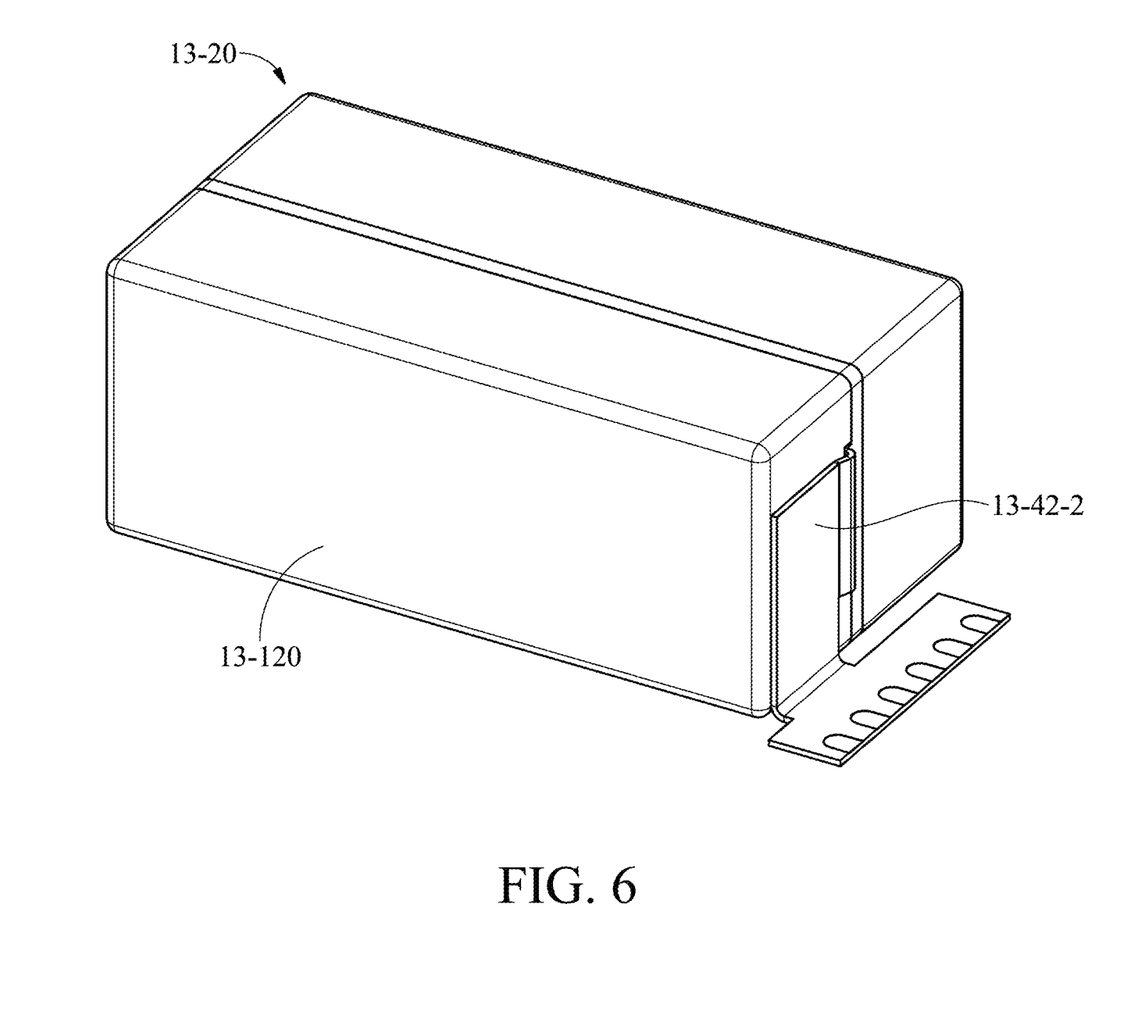
FIG. 6 shows a schematic view of the optical system according to another embodiment of the present disclosure.

Please refer to FIG. 6, in the modified embodiment shown in FIG. 6, the circuit board extending part 13-42-2 is attached to the second optical element 13-120. In this way, the separation of the second optical elements 13-120 from the fixed part 13-20 is avoided, and the internal structure of the optical system 13-100 is more stable.

Figure 7:
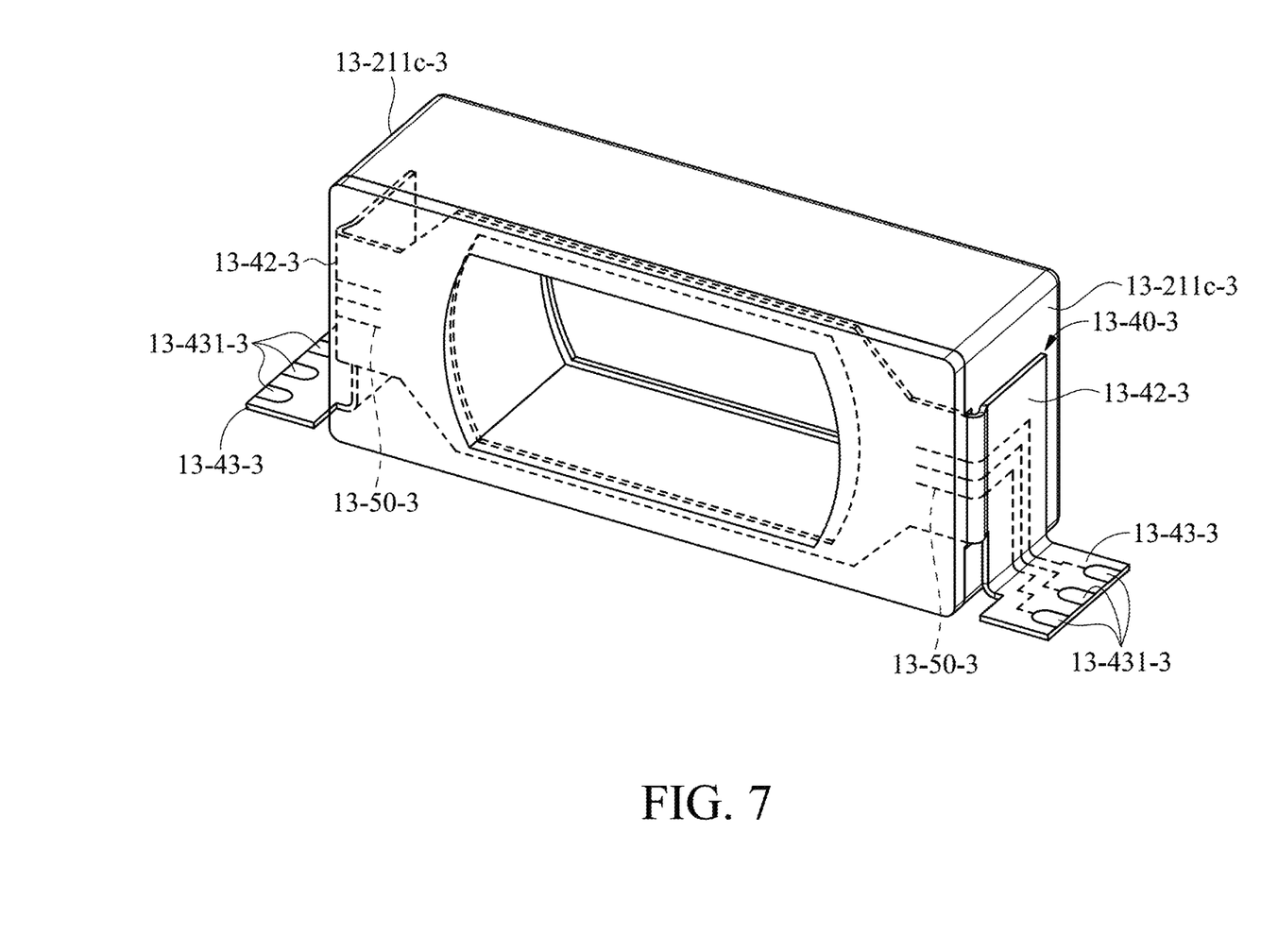
FIG. 7 shows a schematic view of the fixed part outer frame and the circuit assembly of the optical system according to another embodiment of the present disclosure.

Please refer to FIG. 7, in the modified embodiment shown in FIG. 7, the circuit assembly 13-40-3 includes two circuit board extending parts 13-42-3 and two circuit board pin parts 13-43-3, and the circuit board extending parts 13-42-3 are connected to the circuit board pin parts 13-43-3. Each circuit board extending part 13-42-3 is attached to the corresponding fixed part outer frame body side 13-211*c*-3. Since the circuit assembly 13-40-3 has two circuit board extending parts 13-42-3 and two circuit board pin parts 13-43-3, the circuit board body 13-41-3 does not need to have a two-layered plate structure. The metal circuit assembly 13-50-3 can extend from the respective circuit board extending part 13-42-3 to the circuit board pin part 13-43-3 and is electrically connected to the pin 13-431-3 of the circuit board pin part 13-43-3.

Figure 8:
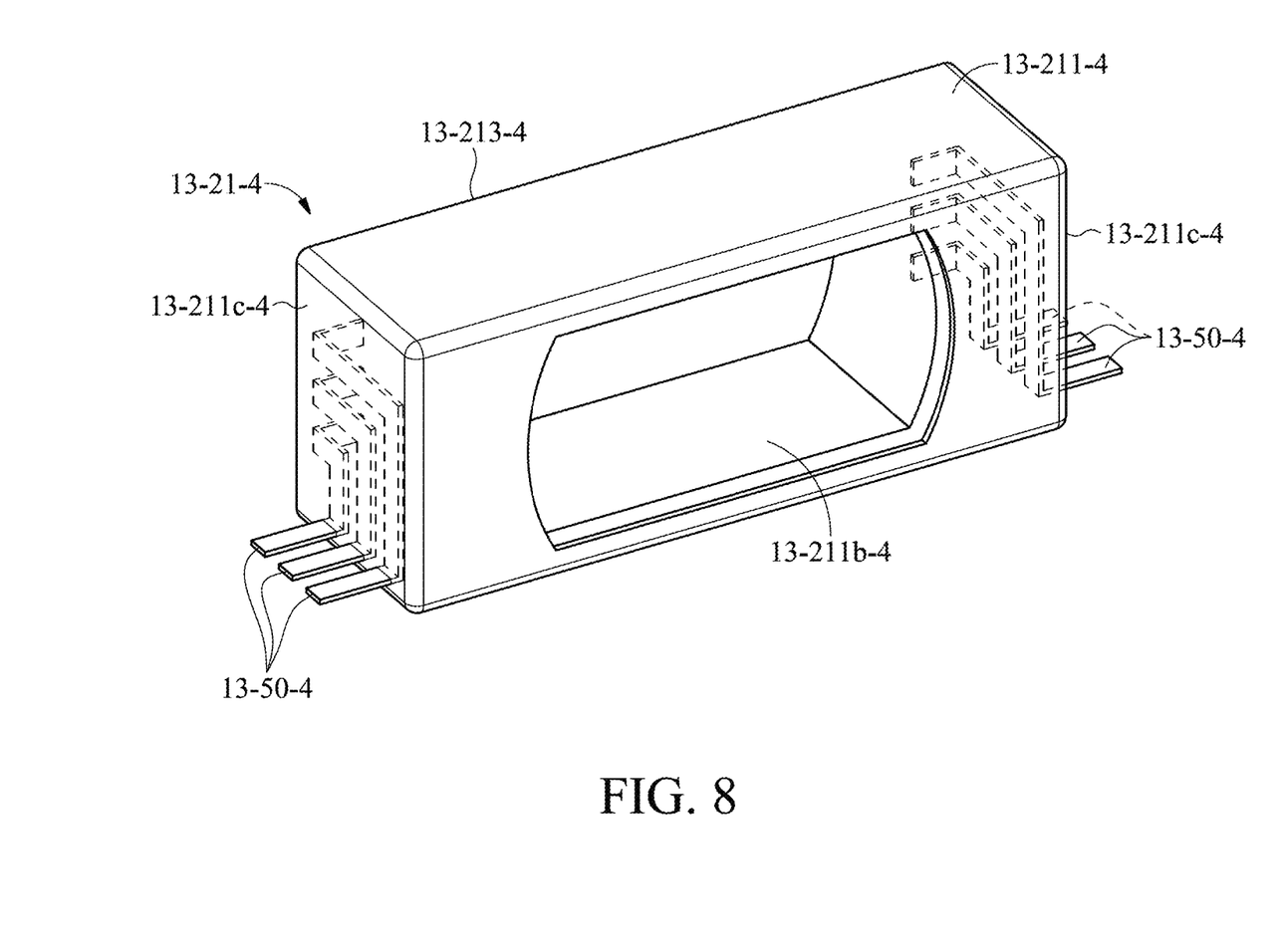
FIG. 8 shows a schematic view of the fixed part outer frame and the metal circuit assemblies of the optical system according to another embodiment of the present disclosure.

Please refer to FIG. 8, in the modified embodiment shown in FIG. 8, the optical system no longer has circuit assemblies. The metal circuit assembly 13-50-4 of the optical system 13-100-4 is disposed in the fixed part outer frame 13-21-4, and the metal circuit assembly 13-50-4 has a three-dimensional routing and is disposed at the fixed part outer frame body side 13-211*c*-4. Specifically, the metal circuit assembly 13-50-4 extends from the fixed part outer frame bottom surface 13-213-4, turning at the boundary between the fixed part outer frame bottom surface 13-213-4 and the fixed part outer frame body side 13-211*c*-4, extending and turning in the fixed part outer frame body side 13-211*c*-4. Thereafter, the metal circuit assembly 13-50-4 extends toward the fixed part outer frame body bottom surface 13-211*b*-4, turning at the boundary between the fixed part outer frame body side 13-211*c*-4 and the fixed part outer frame body bottom surface 13-211*b*-4, and extending out of the fixed part outer frame body 13-211-4 from the fixed part outer frame body side 13-211*c*-4. Thus, the metal circuit assembly 13-50-4 may directly receive the external current, and the structure of the fixed part outer frame 13-21-4 with the three-dimensional metal circuit assembly 13-50-4 is more solid.

Figure 9:
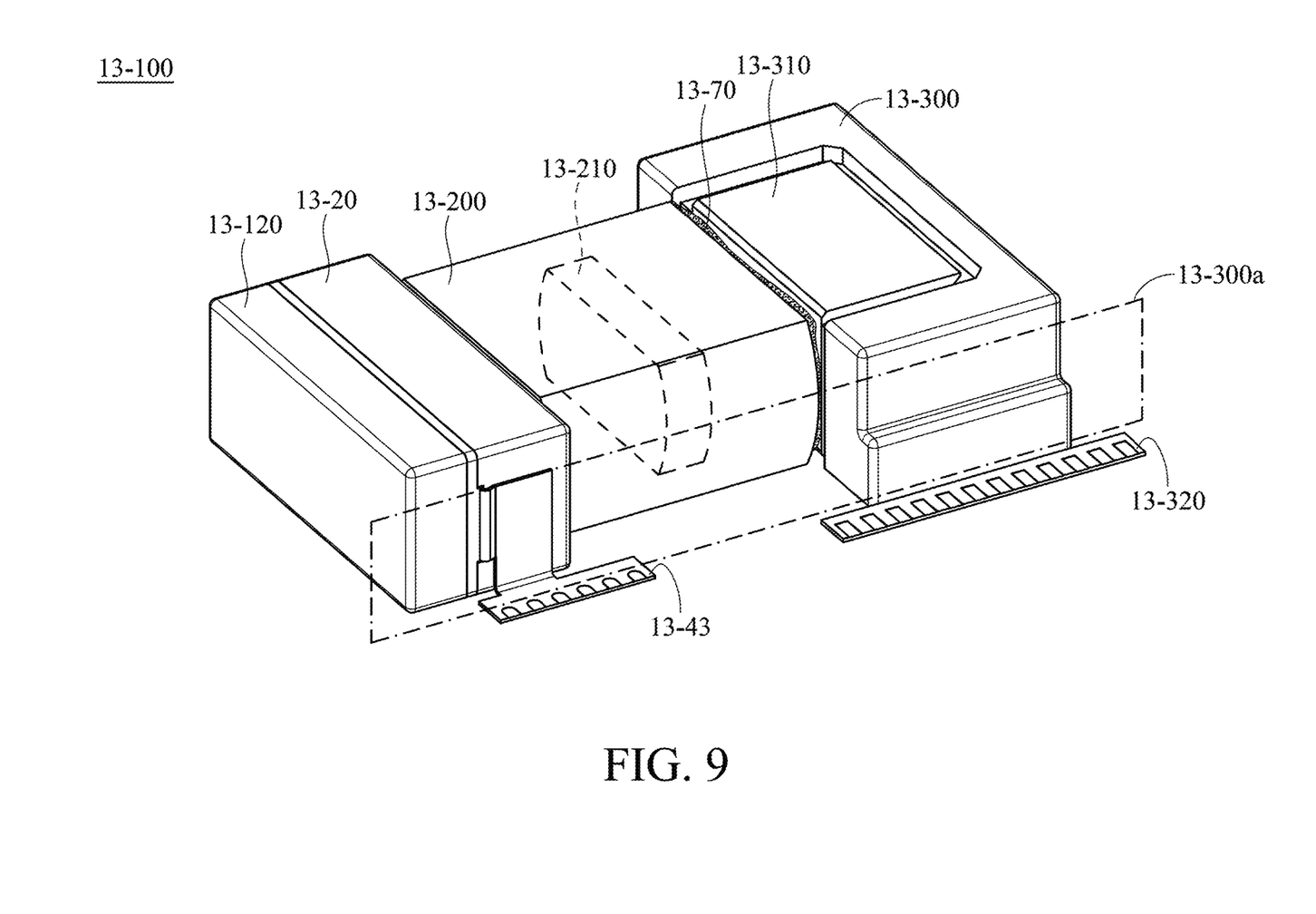
FIG. 9 shows a perspective view of the optical system according to another embodiment of the present disclosure.

Please refer to FIG. 9, the optical system 13-100 may further include a fixed lens module 13-200, a prism module 13-300 and a side 13-300*a*. The fixed lens module 13-200 is connected to the fixed part 13-20. The fixed lens module 13-200 includes a fixed lens assembly 13-210. The fixed lens assembly 13-210 is fixed and non-movable.

Figure 10:
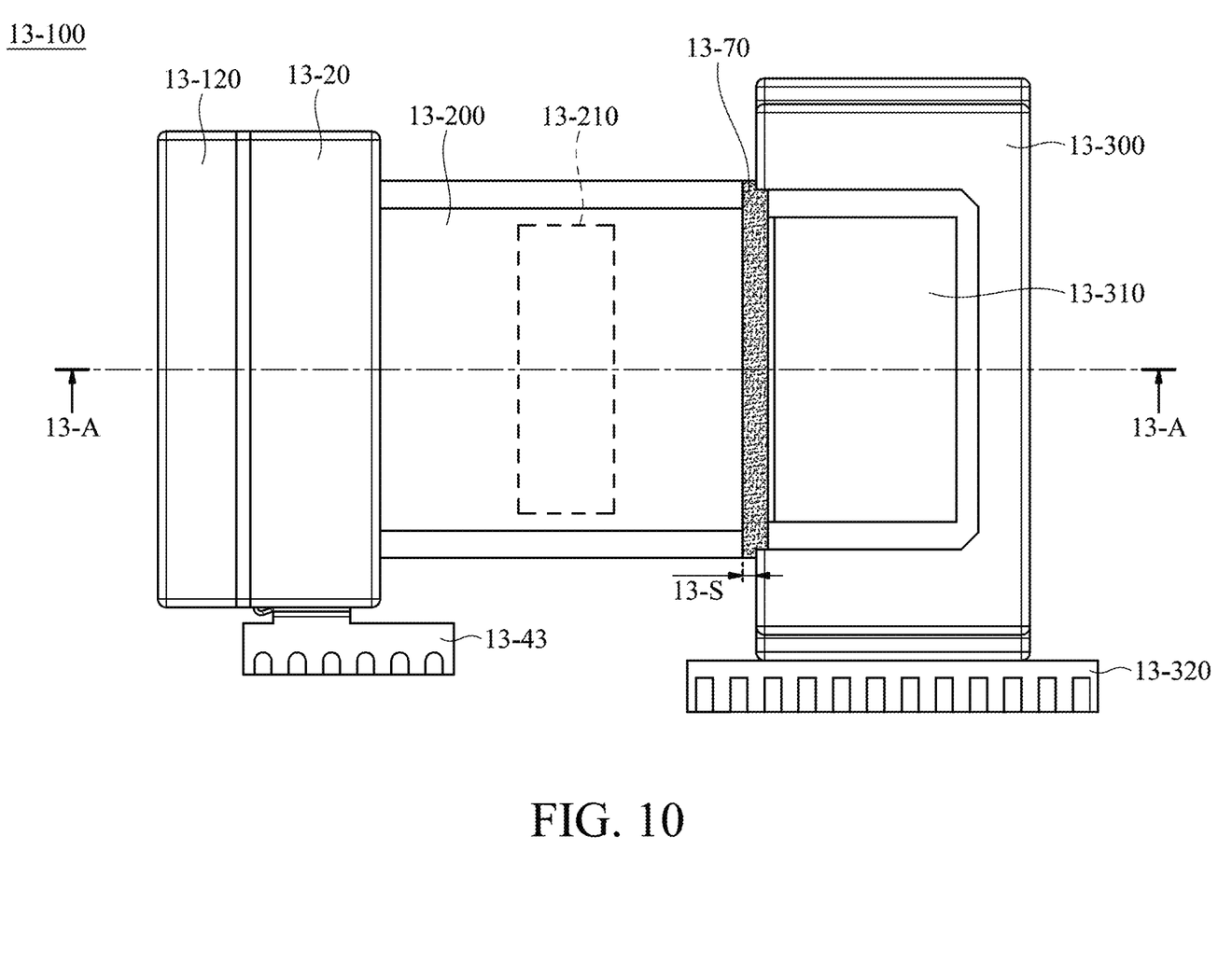
FIG. 10 shows a top view of the optical system according to another embodiment of the present disclosure.
Figure 11:
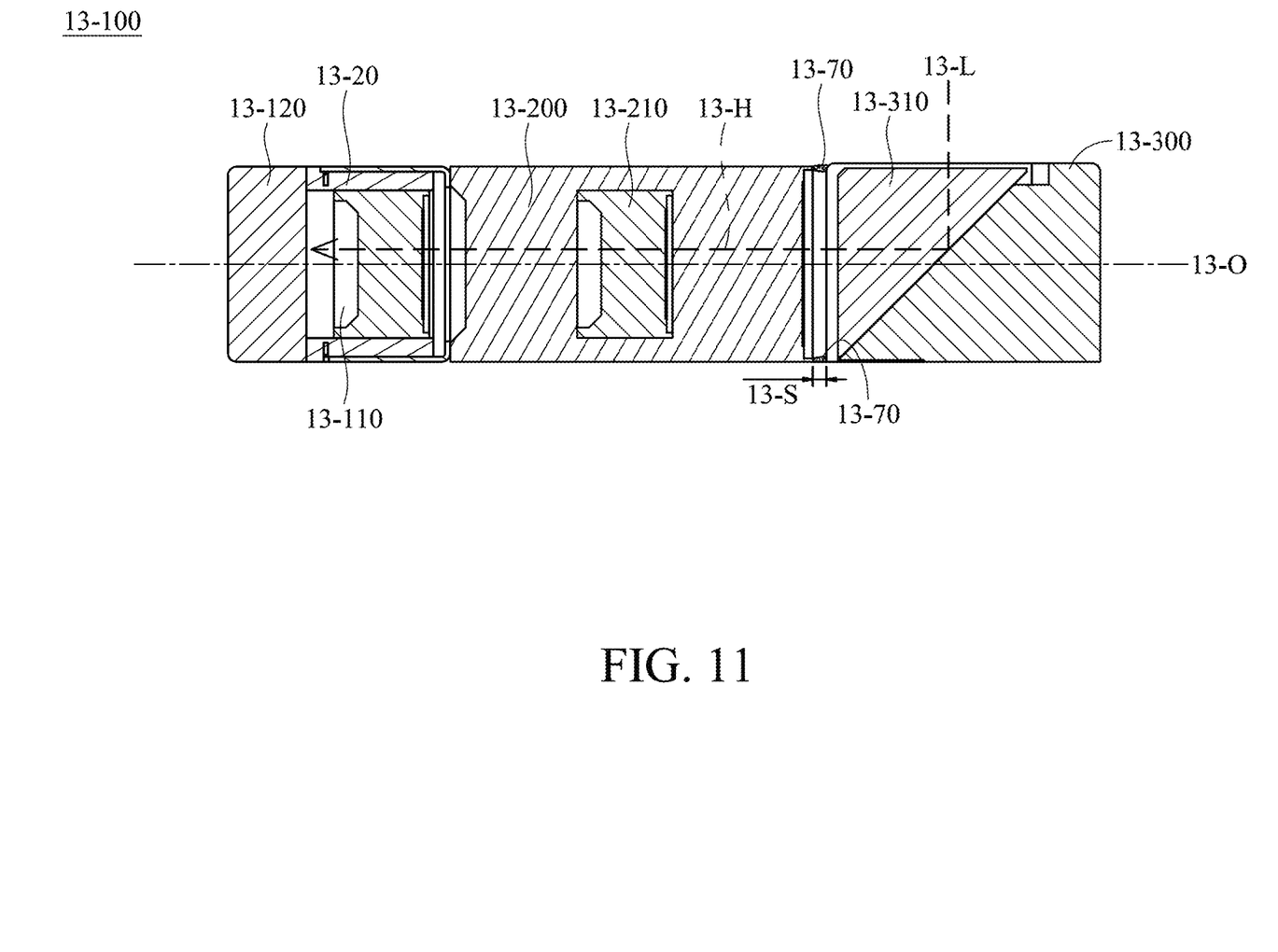
FIG. 11 shows a cross-sectional view of the optical system according to another embodiment of the present disclosure along a line 13-A-13-A in FIG. 10.

Please refer to FIGS. 10 and 11, FIG. 10 is a top view of the optical system 13-100 of another embodiment, FIG. 11 is a cross sectional view of the optical system 13-100 along a line 13-A-13-A in FIG. 10. The prism module 13-300 is connected to the fixed lens module 13-200 via the connecting element 13-70. Specifically, a gap 13-S is provided between the fixed lens module 13-200 and the prism module 13-300, and the connecting element 13-70 is disposed at the gap 13-S. The connecting element 13-70 here can be glue 13-70. Compared with other connecting methods (e.g. screws, etc.), the glue 13-70 enables to correct the error between the fixed lens module 13-200 and the prism module 13-300 when the error exists between the fixed lens module 13-200 and the prism module 13-300. However, it should be noted that the first optical elements 13-110 and the glue 13-70 do not overlap when observed along the optical axis 13-O, so as to avoid the glue 13-70 from affecting the imaging of the optical system 13-100. The prism module 13-300 includes a prism 13-310 and a prism module pin part 13-320.

As shown in FIG. 11, the prism 13-310 may reflect the incident light 13-L to an optical path 13-H, the light 13-L images on the second optical element 13-120 after passing through the fixed lens assembly 13-210 and the first optical element 13-110.

Please refer to FIG. 9 again, the circuit board pin part 13-43 and the prism module pin part 13-320 are located on the side 13-300a of the optical system 13-100. That is, the circuit board pin part 13-43 and the prism module pin part 13-320 are located on the same side. In this way, the connection to the external circuit of the circuit board pin part 13-43 and the prism module pin part 13-320 is facilitated, and the routing of the optical system 13-100 is simplified.

Figure 12:
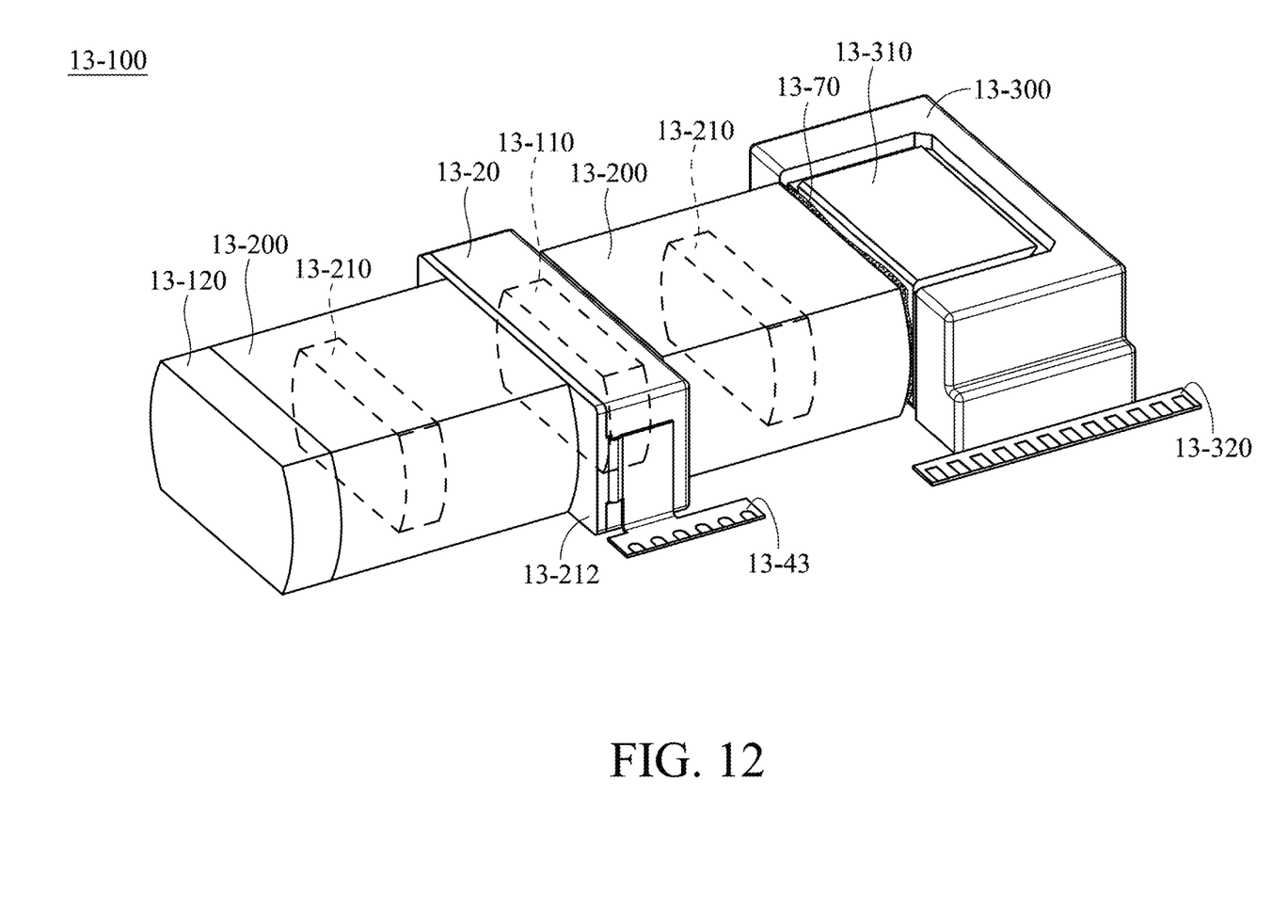
FIG. 12 shows a perspective view of the optical system according to another embodiment of the present disclosure.

As shown in FIG. 12, in some embodiments, the optical system 13-100 may have two fixed lens modules 13-200, these two fixed lens modules 13-200 are positioned at upstream or downstream of the fixed part 13-20. That is, these two fixed lens modules 13-200 abut the fixed part outer frame surface 13-212 and the fixed part outer frame bottom surface 13-213, respectively. Moreover, the second optical element 13-120 is connected to the fixed lens module 13-200 which abuts the fixed part outer frame surface 13-212. In this way, since there are different combinations for the fixed lens assembly 13-210 and the first optical element 13-110, diverse zooming of the optical system 13-100 are provided.

In summary, the zooming of the optical system 13-100 of the present disclosure is achieved through changing the position of the movable part 13-10 and the first optical element 13-110 by the driving assembly 13-30. Furthermore, the present disclosure enables periscope lens to have diverse zooming by combining the fixed lens module 13-200 and the prism module 13-300.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical system, comprising:
   a fixed part;
   a movable part, movable relative to the fixed part;
   a first optical element, connected to the movable part;
   a second optical element;
   a driving assembly, configured for driving the movable part to move relative to the fixed part; and
   a circuit assembly, electrically connected to the driving assembly;
   wherein the circuit assembly comprises a circuit board body, a circuit board extending part, and a circuit board pin part, the circuit board extending part is connected to the circuit board body and the circuit board pin part, the circuit board body is not coplanar with the circuit board extending part or the circuit board pin part,
   wherein the circuit board extending part is attached to the second optical element.

2. The optical system as claimed in claim 1, further comprising two metal circuit assemblies, wherein the fixed part comprising a fixed part outer frame, the metal circuit assemblies are disposed in the fixed part outer frame, and the metal circuit assemblies have three-dimensional routing.

3. The optical system as claimed in claim 2, wherein the fixed part outer frame has a fixed part outer frame bottom surface and two fixed part outer frame body sides, the metal circuit assemblies are disposed in the fixed part outer frame body sides, and extend from the fixed part outer frame bottom surface to the fixed part outer frame body sides, and are exposed to the fixed part outer frame body sides.

4. The optical system as claimed in claim 1, wherein the circuit assembly comprises two circuit board extending parts and two circuit board pin parts, and the circuit board extending parts are connected to the circuit board pin parts.

5. The optical system as claimed in claim 1, wherein the circuit assembly comprises a circuit board extending part and a circuit board pin part, and the circuit board extending part is connected to the circuit board pin part, and the circuit board extending part is coplanar with the circuit board pin part.

6. The optical system as claimed in claim 1, further comprising two metal circuit assemblies, wherein the circuit board body has a two-layered plate structure, the metal circuit assemblies are located in different layers of the two-layered plate structure respectively.

7. The optical system as claimed in claim 1, wherein the first optical element has an optical axis, the circuit board pin part has a plurality of pins, and the pins are arranged along the optical axis.

8. The optical system as claimed in claim 1, wherein the fixed part comprises a fixed part outer frame, the fixed part outer frame comprises a fixed part outer frame body and a fixed part outer frame surface, and the circuit board body is located between the fixed part outer frame body and the fixed part outer frame surface.

9. The optical system as claimed in claim 8, further comprising a connecting element, wherein the circuit board extending part is attached to the fixed part outer frame body via the connecting element.

10. The optical system as claimed in claim 8, wherein the fixed part outer frame body has a fixed part outer frame body bottom surface, the circuit board pin part has a circuit board pin part bottom surface, and the fixed part outer frame body bottom surface is coplanar with the circuit board pin part bottom surface.

11. The optical system as claimed in claim 1, wherein the circuit assembly comprises a circuit board body, the circuit board body has two first sides and two second sides, widths of the second sides is different from widths of the first sides.

12. The optical system as claimed in claim 11, wherein the first sides have a linear structure, and the second sides have a curved structure.

13. The optical system as claimed in claim 11, further comprising at least one sensing assembly, wherein the at least one sensing assembly is disposed on the second sides.

14. The optical system as claimed in claim 1, wherein the first optical element has two sides that are not curved.

15. The optical system as claimed in claim 1, further comprising a fixed lens module and a prism module, wherein a gap is provided between the fixed lens module and the prism module.

16. The optical system as claimed in claim 15, further comprising a side, wherein the circuit assembly comprises a circuit board pin part, the prism module comprises a prism module pin part, and the circuit board pin part and the prism module pin part are located on the side.

17. The optical system as claimed in claim 15, further comprising a connecting element, wherein the connecting element is disposed at the gap between the fixed lens module and the prism module.

18. The optical system as claimed in claim 17, wherein the first optical element has an optical axis, and the first optical element does not overlap the connecting element when observed along the optical axis.

19. An optical system, comprising:
a fixed part;
a movable part, movable relative to the fixed part;
a first optical element, connected to the movable part;
a driving assembly, configured for driving the movable part to move relative to the fixed part; and
a circuit assembly, electrically connected to the driving assembly,
wherein the circuit assembly comprises a circuit board body, a circuit board extending part, and a circuit board pin part, the circuit board extending part is connected to the circuit board body and the circuit board pin part, the circuit board body is not coplanar with the circuit board extending part or the circuit board pin part,
wherein the first optical element has an optical axis, the circuit board pin part has a plurality of pins, and the pins are arranged along the optical axis.

20. An optical system, comprising:
a fixed part;
a movable part, movable relative to the fixed part;
a first optical element, connected to the movable part;
a driving assembly, configured for driving the movable part to move relative to the fixed part; and
a circuit assembly, electrically connected to the driving assembly,
wherein the circuit assembly comprises a circuit board body, a circuit board extending part, and a circuit board pin part, the circuit board extending part is connected to the circuit board body and the circuit board pin part, the circuit board body is not coplanar with the circuit board extending part or the circuit board pin part,
wherein the fixed part comprises a fixed part outer frame, the fixed part outer frame comprises a fixed part outer frame body and a fixed part outer frame surface, and the circuit board body is located between the fixed part outer frame body and the fixed part outer frame surface,
wherein the fixed part outer frame body has a fixed part outer frame body bottom surface, the circuit board pin part has a circuit board pin part bottom surface, and the fixed part outer frame body bottom surface is coplanar with the circuit board pin part bottom surface.

* * * * *